United States Patent [19]

Laikin et al.

[11] 4,051,523
[45] Sept. 27, 1977

[54] SUBMERSIBLE CAMERA

[75] Inventors: Milton Laikin, Los Angeles; George L. Hatchett, El Cajon, both of Calif.

[73] Assignee: Hydro Products, Inc., San Diego, Calif.

[21] Appl. No.: 593,116

[22] Filed: July 3, 1975

[51] Int. Cl.$^2$ ............................................. H01J 29/89
[52] U.S. Cl. ...................................... 358/99; 358/225
[58] Field of Search ............ 178/7.82, 7.85, DIG. 37, 178/DIG. 38, 7.87, 7.88, 7.2; 176/6.8

[56] References Cited

U.S. PATENT DOCUMENTS

| | | | |
|---|---|---|---|
| 2,849,530 | 8/1958 | Fleet | 178/DIG. 1 |
| 2,905,758 | 9/1959 | Walker | 178/7.2 |
| 3,780,224 | 12/1973 | Levine | 178/7.85 |

Primary Examiner—Robert L. Griffin
Assistant Examiner—Michael A. Masinick
Attorney, Agent, or Firm—Fulwider, Patton, Rieber, Lee & Utecht

[57] ABSTRACT

A closed circuit television camera intended to be lowered into a body of water to inspect articles within the water. The camera has a lens capable of movement of 90° each side of its normal axis, thus permitting the camera to scan an angle of 180° from one side to the other.

7 Claims, 8 Drawing Figures

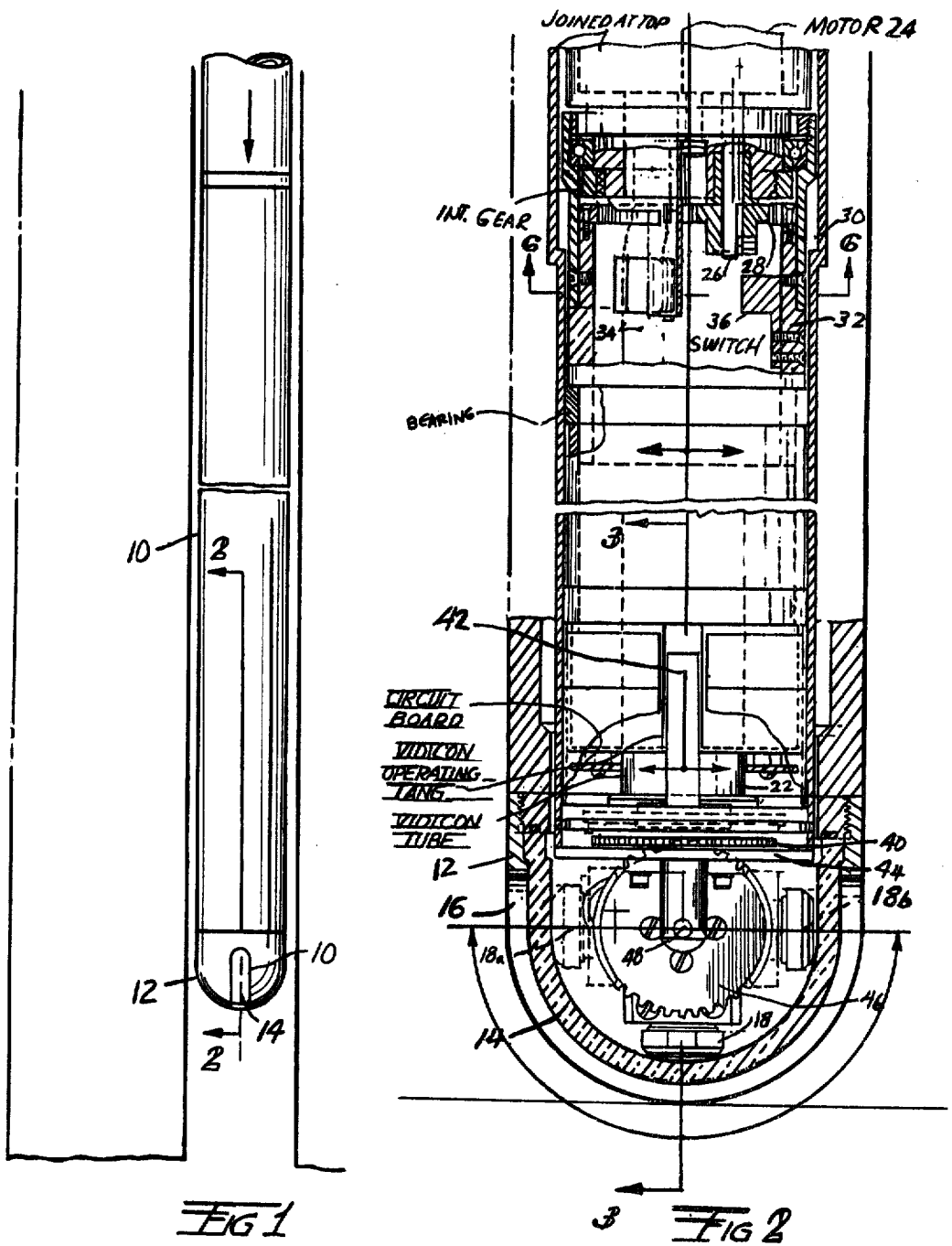

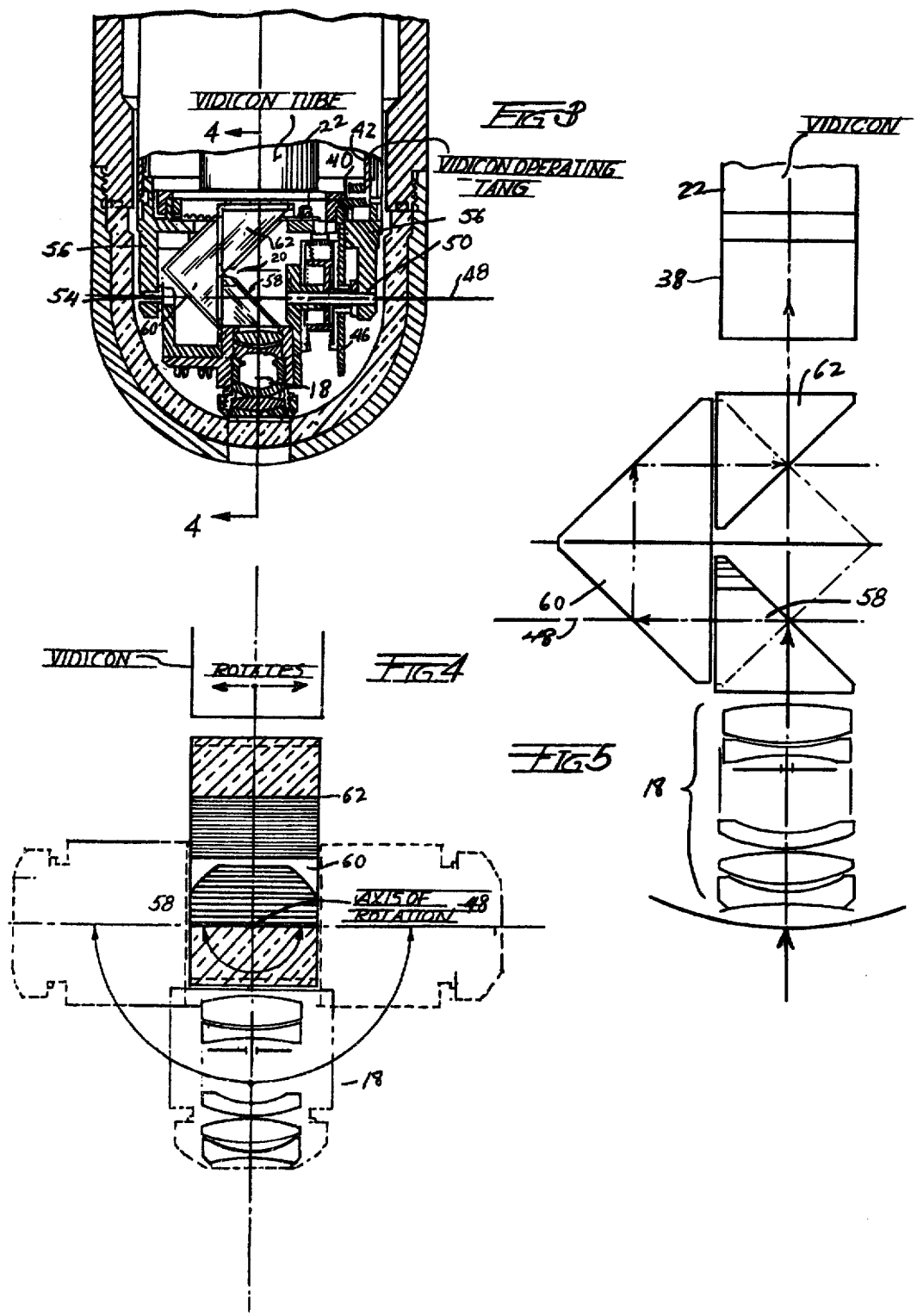

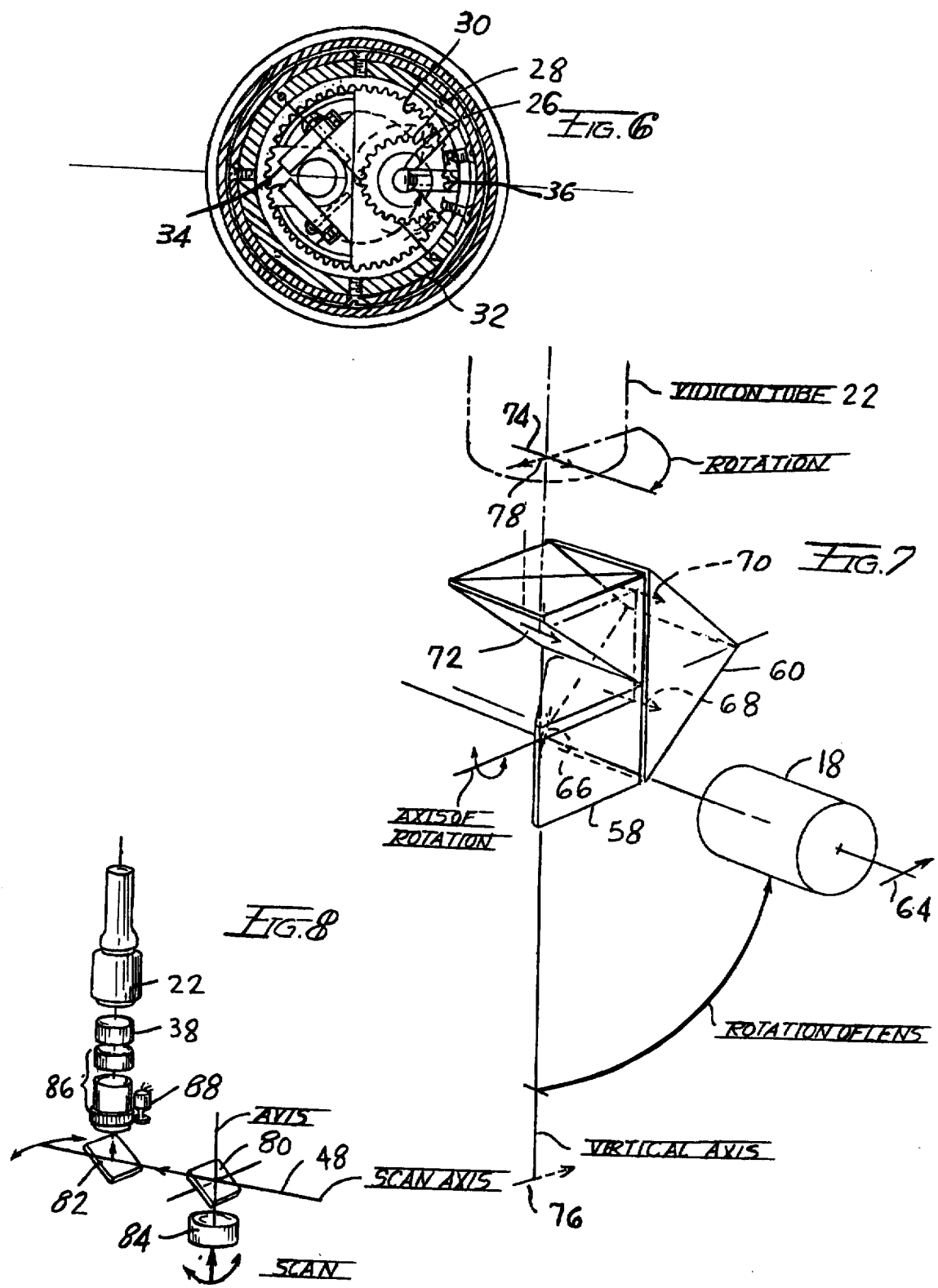

SUBMERSIBLE CAMERA

BACKGROUND OF THE INVENTION

In a number of fields, it is necessary to inspect objects that are immersed within a body of water, the conditions being such that it is not possible or not practical to send a person into the area to make a direct visual inspection. Thus, in some marine salvage and exploration work, it is sometimes not possible to send a diver into the area, and in other cases, such as inspection of the core of a nuclear reactor, it is not possible to send a person down to make a direct visual inspection. However, the need for inspection remains.

The present camera makes use of a television camera enclosed within a housing particularly adapted for use in small spaces. The signals from the camera are transmitted to a monitor located at some convenient location where they can be observed by an operator. The camera is provided with means for swinging its lens from one side to the other, under control of the operator, so that the effective field of view is not restricted to a relatively few degrees straight ahead of the camera, but instead, the camera lens may be swung approximately 90° each side of its normal straight-ahead position.

The conditions under which the camera is intended to be operated require a relatively small sized camera, and by way of example, cameras made according to the present invention have been enclosed in generally tubular housings having a maximum outer diameter of three inches. Also, in the case of nuclear reactors, the materials used in the camera must be able to withstand radiation without deteriorating or discoloring, and in may cases, the camera will be used at depths up to 20,000 ft. and consequently, must be capable of withstanding such external pressures.

SUMMARY OF THE INVENTION

The present invention comprises a tubular housing containing a vidicon on equivalent tube, circuit means to operate the vidicon, a lens adapted to be swung from one side to the other, motor means for driving the lens, a "optical joint", and means for keeping the image erect on the monitor.

DESCRIPTION OF THE FIGURES

FIG. 1 is an elevational view of the camera as it would appear being lowered in a restricted area such as in a pipe or between closely adjacent objects;

FIG. 2 is a view, partly in section, taken on the line 2—2 of FIG. 1, and showing a portion of the motor drive means, the vidicon tube and the lens and its driving means;

FIG. 3 is a sectional view, taken on the line 3—3 of FIG. 2, and showing a lens and optical joint;

FIG. 4 is a diagrammatic sectional view, taken on the line 4—4 of FIG. 3, showing the elements of the optical joint;

FIG. 5 is a diagrammatic view of the path of the light through the optical joint;

FIG. 6 is a cross-sectional view, taken on the line 6—6 of FIG. 2, and showing the motor drive gears;

FIG. 7 is a perspective diagrammatic view showing the rotation of the image as the lens is rotated; and FIG. 8 is a diagrammatic view of a modified form of camera.

DESCRIPTION OF PREFERRED FORM

Referring now to the drawings, and particularly to FIG. 1 thereof, the numeral 10 indicates generally a housing, generally cylindrical, of a material of sufficient strength to withstand the pressures to which it will be exposed. For relatively low pressures, steel tubing will be satisfactory, but for submersion to greater depths, such as 20,000 ft., titanium is the preferred material. At its upper end, the tube is provided with a supporting means (not shown) that is adapted for connection to a cable or to a structure, depending upon the requirements of the situation. While a cable is much the simpler form of supporting means, it does not provide the directional stability that may be needed. Thus, where the camera is to be lowered into the core section of a nuclear reactor, it may be important to be able to locate the position of an abnormality or damaged section precisely, and a cable suspension means would not be suitable. Under these conditions, a movable structure is used to lower and support the camera.

At the lower end of the housing 10 is a generally hemispherically shaped end member 12 and within that member is a transparent dome 14 likewise made of a material suitable to withstand the pressure to which it may be subjected. A slot 16 is formed in the end member 12 located in the plane that includes the axis of the housing 10, with the slot extending a distance somewhat greater than 180° and being symmetrically positioned with respect to the axis. A lens 18 is mounted within the dome 14 in a position to align with the slot 16, the slot being wide enough to accomodate the angle of view of the lens 18 without intruding into this field.

In FIG. 2, it will be noted that the lens 18 is capable of being moved from the position indicated in dotted outline and identified as 18a to the opposite position indicated in dotted outline as position 18b.

Behind the lens 18 is an optical joint 20 shown in FIG. 3, and behind the optical joint is an image pick-up tube 22. While the image pick-up tube is herein referred to as a vidicon tube, it is to be understood that the invention is not to be limited to this particular type of tube, but may use any suitable type of image pick-up apparatus.

As will hereinafter become apparent, when the lens 18 is moved from its straight-ahead position to the position at one side, indicated as position 18b, the image formed by that lens appears to rotate on the vidicon screen. As a result, a person watching the image on the monitor would see the image rotate first in one direction and then in the other as the lens 18 is rotated between positions 18a and 18b. To eliminate this unsatisfactory condition, the vidicon is rotated in synchronism with the rotation of the lens 18.

To accomplish this, a motor 24 is mounted in the upper portion of the housing 1. As seen in FIG. 2, the motor has an output shaft 26 carrying a gear 28 that meshes with an internal ring gear 30 carried by a rotatable sleeve 32. The motor 24 is reversible and switches 34 are provided, together with switch operating means 36, to limit the direction of rotation of the sleeve 32. Suitable means (not shown) are provided to energize the motor 24, and normally the motor will be controlled so that it may be driven within its limits in either direction under the control of the operator, or, likewise under the control of the operator, may be set to rotate to the limit in one direction, reverse, rotate to the limit in the other direction, and then return in the first direction, repeating this cycle as long as desired.

The sleeve 32 rotates within the housing 10 and extends downwardly towards the lens 18. At its lower end, the sleeve 32 supports the vidicon 22 so that as the sleeve is rotated, the vidicon is correspondingly rotated. As an alternative, and as schematically indicated in FIG. 5, the vidicon 22 may be held stationary, and a separate image rotator 38 inserted in the optical path between the optical join and the vidicon. The image rotator 38 may be of any convenient and conventional type, such as a dove prism, a pechan prism, etc., and the term image rotator, as used in the claims, is to be understood as including the separate means 38 as well as the means for rotating the image pick-up tube 22.

Rotatable with the sleeve 32 is a gear 40 at the lower end of the tube that, for convenience, may be separable from the sleeve, and as shown in FIG. 2, the gear is provided with a tang 42 that extends into a slot in some member that rotates with the sleeve.

The gear 40 is provided with teeth 44 on its lower or forward face, and these mesh with corresponding teeth on a gear 46 that rotates with the lens 18. With this arrangement, when the sleeve 32 is rotated about the longitudinal axis of the housing 10, the lens 18 is rotated about a perpendicular scan axis 48.

As seen in FIG. 3, the gear 46 is mounted for rotation on a stub shaft 50 aligned with the scan axis 48 and the shaft carries the lens 18 and associated mounting equipment 52 that, in turn, is connected to another stub shaft 54. The shafts 50 and 54 are aligned and thus provide a complete support for the lens 18 and the associated mounting equipment 52, and in turn, the shafts are mounted in a supporting structure 56 that is located outside the rotatable sleeve 32 which does not rotate with that member, but instead remains fixed with respect to the housing 10.

In addition to the lens 18, the associated mounting equipment 52 carries a prism 58 of a type known as a right-angle prism. This prism has the effect of reflecting the light from the lens 18 along the scan axis 48, so that as the lens 18 is rotated about that axis, its image is at all times projected along the axis.

Aligned with the right-angle prism 58 is a porro prism mounted in a non-rotating support member 56. The action of the porro prism 60 is to receive the light from the right-angle prism 58 traveling along the axis of rotation 48, and to then reflect that light upwardly, and then back, in a direction parallel to the axis 48 and into a second right-angle prism 62. The right angle prism 62 receives the light or image from the porro prism 60 and reflects it along the longitudinal axis of the housing 10 and into the vidicon 22. The optical path that the light from the lens 18 follows is shown in FIG. 5, where it will be seen that the right-angle prism 58 rotates about the scan axis 48. Mechanically, the arrangement of parts is illustrated in diagrammatic form in FIG. 4.

As previously mentioned, the rotation of lens 18 about the scan axis 48 causes a rotation of the image emerging from the right-angle prism 62. The reason for this rotation is indicated in FIG. 7. In that figure, a horizontal line 64, extending from front to back, is viewed by the lens 18, and the line is inverted in the customary manner of lenses and appears as a horizontal line 66, extending from back to front, on the hypotenuse of the right-angle prism 58. From the hypotenuse or reflecting surface of the prism, the image 66 is reflected across the porro prism 60, where it appears as an image 68 on the first reflecting surface of that prism, from which it is reflected to form the image 70 on the second reflecting surface of the same prism. From that second reflecting surface of the porro prism 60, the image is reflected to form image 72 on the reflecting surface of the second right-angle prism 62, from which surface it is reflected upwardly to form an image 74 on the vidicon screen.

When the lens 18 is in its vertical position, aligned with the vertical axis of the housing 10, a horizontal line 76, parallel to the line 64, will be inverted by the lens and then appear as line 78 on the vidicon screen, perpendicular to line 74. It will be recognized that this indicates that as the lens 18 is rotated from a vertical to a horizontal position, the image on the vidicon screen is also rotated. This would mean that parallel lines will rotate on the screen as the lens 18 scans from side to side. Obviously, this is a condition that is not desirable, and it has been overcome in the present invention by either rotating the vidicon in synchronism with the rotation of the lens 18, or by operation of an image rotator 38, as previously mentioned.

It will be appreciated that the distance from the lens 18 to the screen of the vidicon 22 is a considerable distance, and it is generally greater than the normal focal length of a lens such as might be used in the present environment. Consequently, instead of using a conventional lens, it is generally preferable to use an inverted telephoto lens having an actual back focal length considerably greater than the nominal focal length. Such lenses are known, and no claim is made to such a lens, per se.

OPTIONAL CONSTRUCTION

It will be recognized that, while the prisms 58, 60 and 62, are very convenient devices for changing the direction of a beam of light, other equivalent optical devices may be used. Thus, each of the prisms may be replaced by one or more mirrors, and the lens may be designed so that instead of having all of the refracting elements in front of the first prism or mirror, the elements may be divided into two or more groups, with some elements before and some behind the optical joint. Likewise, instead of using a fixed focal length lens, it is possible to use a variable focal length or zoom lens.

FIG. 8 is a diagrammatic view of an alternate form of camera, making use of a number of the modification mentioned. Thus, instead of using prisms, the optical joint is formed with mirrors 80 and 82. The lens system includes a front group 84 and a rear group 86, which together produce the desired image on the vidicon 22. The vidicon 22 may be rotated. or an image rotator 38 may be inserted in the optical path, as indicated. If desired, the lens combination 84–86 may be a zoom lens, in which case a motor 88 may be provided for remote control of the focal length.

In addition to rotation about the scan axis 48, the entire optical system may be rotated about the longitudinal axis of the housing, so that the plane of the scanning lens may be rotated. Of course, the system shown in FIG. 8 can make use of additional reflectors, so that the vidicon 22 is on the longitudinal axis of the housing, as in the previously described form, but if space requirements are not critical and the larger sized housing can be tolerated, the offset system shown in FIG. 8 is very practical.

Throughout this description, use has been made of the directions, up, down, in, out, etc. These are for convenience in description and clarity of understanding, and are not to be considered as limitations.

It is to be understood that in each of the forms the equipment is to be compatible with the environment in which it it is to be used. Thus, if the camera is to be lowered a considerable distance into the ocean, the housing and all connections must be constructed to withstand the pressures encountered. Furthermore, all of the elements, including the lubrication of moving parts, must be such that they operate properly at the temperatures to be encountered. Additionally, when the camera is to be used in connection with the inspection of nuclear reactors, the lenses, mirrors, prisms, and electronic equipment must be such as not to be affected by radiation.

In each form of device, the necessary operating elements, such as electronic circuitry, etc. are provided for operation of the image pick-up tube 22, the scanning motor 24, the focal length motor 88, and other necessary drives. Likewise, electrical connections are provided, including means for transmitting power and signals to the camera, and signals from the camera. Such elements may be of conventional types, and no claim is herein made to them separate and apart from the invention as a whole.

From the foregoing it will be seen that there has been provided a camera of the class described, fully capable of achieving the results and securing the advantages set forth. While a preferred and alternate forms of construction have been illustrated, it is to be understood that the invention is not to be limited to the particular form or arrangement of parts herein described and shown, except as limited by the claims.

We claim:
1. A camera which includes:
a housing;
a transparent closure at one end of said housing;
an image pick-up tube within said housing;
a lens within said housing positioned with its field of view extending through said transparent closure, adapted to form an image on said pick-up tube;
means for rotating said lens about a scan axis so that its field of view will sweep from side to side, the plane in which said lens rotates passing through the axis of said housing;
an optical joint rotatable about said scan axis to transmit said image from said lens toward said image pick-up tube;
image rotating means adapted to rotate said image on said pick-up tube and in a plane perpendicular to the plane of rotation of said lens; and
motor means operable to rotate said lens about said scan axis and simultaneously to rotate said image rotating means.

2. A camera as described in claim 1, in which said image rotating means includes means for rotating said image pick-up tube.

3. A camera as described in claim 1, in which said image rotating means includes prism means in the optical path between said lens and said image pick-up tube.

4. A camera as described in claim 1, in which said lens has a back focal length greater than its nominal focal length.

5. A camera as described in claim 1, in which said lens has a portion of its elements before said optical joint and the remainder of its elements after said joint.

6. A camera as described in claim 1, in which said motor means drives a rotatable member that, in turn, drives said image rotating means, and said image rotating means drives said image for rotating said lens.

7. A camera as described in claim 6, in which said image rotating means includes means for rotating said image pick-up tube, and said lens has a back focal length greater than its nominal focal length.

* * * * *